United States Patent
Wei (10) Patent No.: US 12,489,514 B2
(45) Date of Patent: Dec. 2, 2025

(54) METHOD OF CHANNEL MEASUREMENT FOR INTELLIGENT REFLECTING SURFACE ASSISTED WIRELESS NETWORK AND BASE STATION USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 423 days.

(21) Appl. No.: 17/684,442

(22) Filed: Mar. 2, 2022

(65) Prior Publication Data

US 2023/0283357 A1    Sep. 7, 2023

(51) Int. Cl.
*H04B 7/155* (2006.01)
*H04W 24/10* (2009.01)

(52) U.S. Cl.
CPC ..... *H04B 7/15514* (2013.01); *H04B 7/15557* (2013.01); *H04W 24/10* (2013.01)

(58) Field of Classification Search
CPC ............ H04B 7/15514; H04B 7/15557; H04B 7/145; H04W 24/10; H04W 24/02; H04W 8/24
See application file for complete search history.

(56) References Cited

U.S. PATENT DOCUMENTS

| | | | |
|---|---|---|---|
| 2021/0126359 A1* | 4/2021 | Kim | H04B 7/145 |
| 2022/0077919 A1* | 3/2022 | Li | H04B 7/04013 |
| 2022/0216908 A1* | 7/2022 | Choi | H04B 7/043 |
| 2022/0407222 A1* | 12/2022 | Zhu | H04B 7/0617 |
| 2023/0022225 A1* | 1/2023 | Gunturu | H04B 7/04013 |
| 2023/0042538 A1* | 2/2023 | Sun | H04L 5/0094 |
| 2023/0048721 A1* | 2/2023 | Gurelli | H04B 17/382 |
| 2023/0098229 A1* | 3/2023 | Gurelli | G01S 5/10 455/456.1 |
| 2023/0125038 A1* | 4/2023 | Zhou | H04B 17/336 370/329 |
| 2023/0176174 A1* | 6/2023 | Penna | H01Q 3/46 342/451 |
| 2023/0180020 A1* | 6/2023 | Gurelli | H04W 16/28 370/329 |
| 2023/0180094 A1* | 6/2023 | Gurelli | H04W 72/044 370/336 |
| 2023/0189021 A1* | 6/2023 | Ali | H04W 24/02 370/252 |

(Continued)

FOREIGN PATENT DOCUMENTS

| | | |
|---|---|---|
| CN | 113804961 | 12/2021 |
| CN | 113905441 | 1/2022 |
| WO | 2021221603 | 11/2021 |

*Primary Examiner* — Jinsong Hu
*Assistant Examiner* — Rui M Hu
(74) *Attorney, Agent, or Firm* — JCIPRNET (57) ABSTRACT

A method of channel measurement for intelligent reflecting surface assisted wireless network and a base station (BS) using the same method are provided. The method includes: transmitting a measurement configuration comprising mode information of an intelligent reflecting surface to a user equipment; receiving a measurement report corresponding to the measurement configuration from the user equipment, wherein the measurement report corresponds to a channel between the user equipment and the intelligent reflecting surface; and outputting a command according to the measurement report.

21 Claims, 8 Drawing Sheets

(56) References Cited

U.S. PATENT DOCUMENTS

| | | | |
|---|---|---|---|
| 2023/0239723 A1* | 7/2023 | Gurelli | H04L 45/24 370/329 |
| 2023/0254031 A1* | 8/2023 | Gurelli | H04B 7/0617 455/15 |
| 2023/0266457 A1* | 8/2023 | Gurelli | G01S 13/876 342/125 |
| 2023/0275644 A1* | 8/2023 | Yao | H04B 7/06958 375/262 |
| 2023/0291460 A1* | 9/2023 | Gurelli | H04B 7/145 |
| 2023/0308139 A1* | 9/2023 | Baligh | H04B 7/04013 |
| 2023/0318177 A1* | 10/2023 | Zhou | H04L 25/0204 455/456.1 |
| 2023/0327831 A1* | 10/2023 | Xu | H04W 24/08 370/329 |
| 2023/0370931 A1* | 11/2023 | Wang | H04W 36/30 |
| 2024/0014860 A1* | 1/2024 | Wang | H04B 7/026 |
| 2024/0048214 A1* | 2/2024 | Kwon | H04B 7/0695 |
| 2024/0056129 A1* | 2/2024 | Duan | H04L 5/0051 |
| 2024/0069146 A1* | 2/2024 | Duan | G01S 5/0273 |
| 2024/0098599 A1* | 3/2024 | Zhang | H04W 36/22 |
| 2024/0223291 A1* | 7/2024 | Ren | H04B 17/336 |
| 2024/0267108 A1* | 8/2024 | Xu | H04B 17/10 |
| 2024/0356585 A1* | 10/2024 | Ly | H04L 5/0051 |
| 2024/0364434 A1* | 10/2024 | Sahraei | H04B 17/309 |
| 2024/0388328 A1* | 11/2024 | Elshafie | H04B 7/0639 |
| 2024/0413858 A1* | 12/2024 | Mcmenamy | H04W 24/10 |

* cited by examiner

METHOD OF CHANNEL MEASUREMENT FOR INTELLIGENT REFLECTING SURFACE ASSISTED WIRELESS NETWORK AND BASE STATION USING THE SAME

BACKGROUND

Technical Field

The present disclosure relates to the field of wireless communication, and more particularly, to a method of channel measurement for intelligent reflecting surface assisted wireless network and a base station (BS) using the same method.

Description of Related Art

Figure 1:
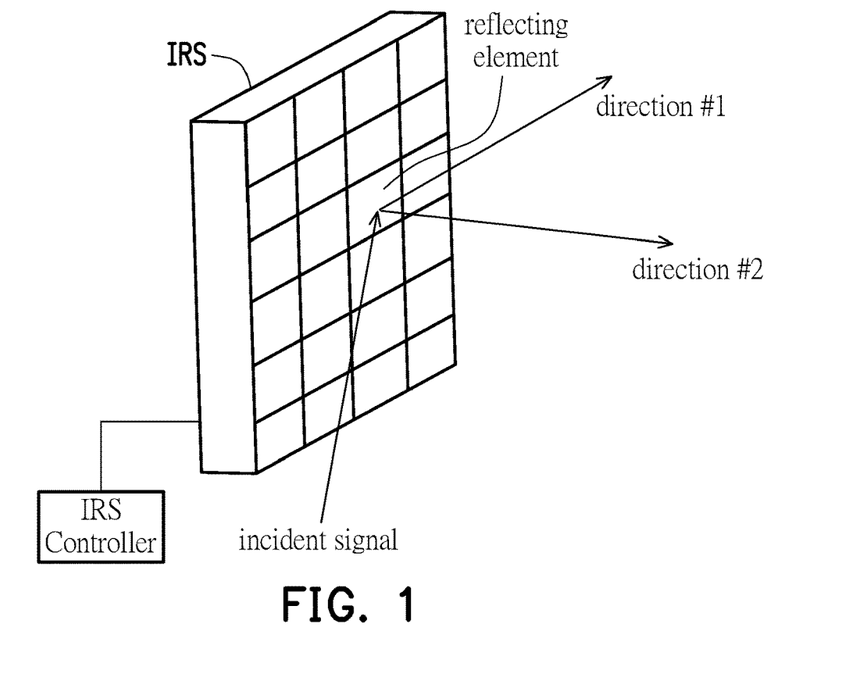
FIG. 1 illustrates a schematic diagram of IRS.

An Intelligent reflecting surface (IRS) may be implemented by a control circuit board, a copper backplane, and a plurality of reflecting elements and may be controlled by an IRS controller, as shown in FIG. 1. A reflecting element may comprise one or more meta-atoms. In order to improve the performance of wireless communication, the IRS controller may configure or reconfigure the IRS with different electronic signals so as to change the reflecting characteristics of the reflecting elements. Accordingly, the reflecting element may reflect incident signal to different directions (e.g., direction #1 or direction #2 in FIG. 1).

Figure 2:
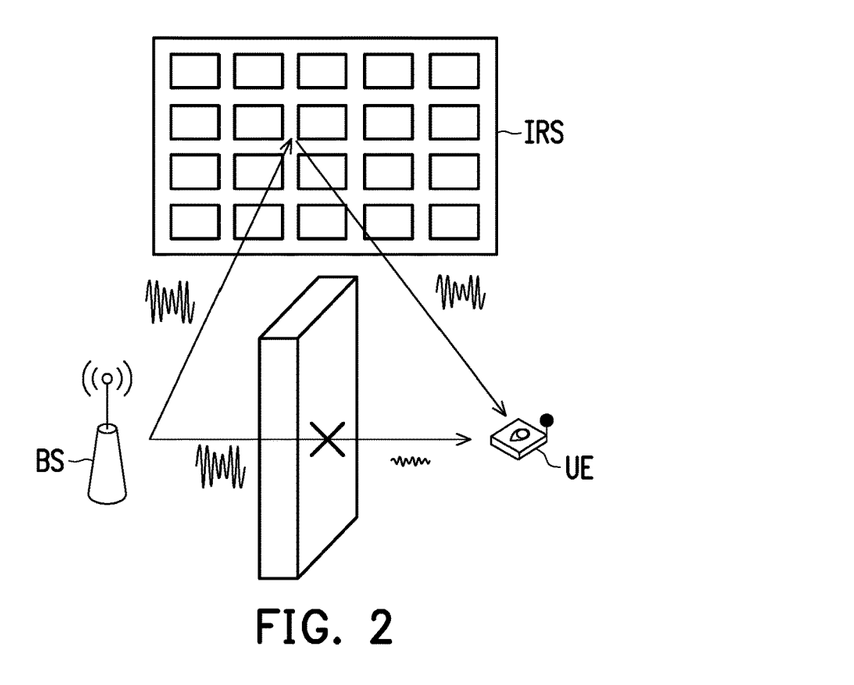
FIG. 2 illustrates a schematic diagram of IRS improving wireless signal reception in dead zone.
Figure 3:
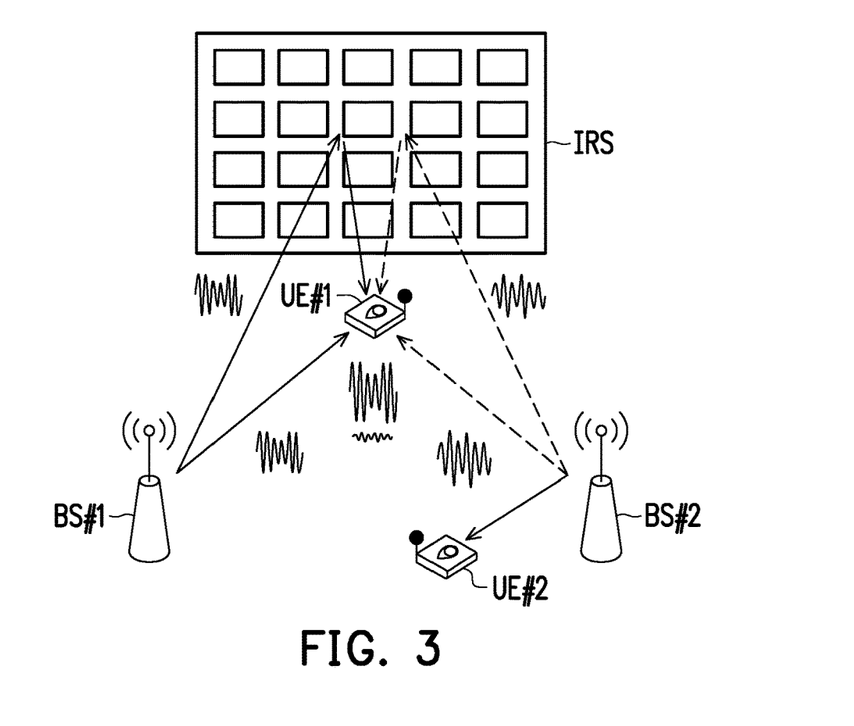
FIG. 3 illustrates a schematic diagram of IRS improving wireless signal reception in cell edge.

IRS is considered as a key enabling technology for future wireless networks (e.g., 5G, beyond 5G, or 6G). IRS could be applied to improve the signal reception within a cell, as shown in FIG. 2. In FIG. 2, a concrete wall disposed between the BS and the UE leads a severe degradation in quality of the signal transmitted from the BS to the UE directly. The IRS may be configured to reflect the signal from the BS to the UE so as to improve the signal reception at the UE end. IRS could also be applied to improve the signal reception in cell edge, as shown in FIG. 3. In FIG. 3, the UE (e.g., UE #1 or UE #2) at the edge of BS #1 and BS #2 may receive signals from both BS #1 and BS #2. Take UE #1 as an example, if UE #1 is served by BS #1, the IRS may be configured to improve the quality of the signal transmitted by BS #1 and reduce the quality of the signal transmitted by BS #2 at UE #1 end. Thus, the interference to UE #1 caused by BS #2 may be minimized.

Since characteristics of wireless channel might change significantly due to different IRS modes, how to configure an ideal operation mode for the IRS is an important issue to the field.

SUMMARY

The present disclosure is directed to a method of channel measurement for IRS-assisted wireless network and a base station using the same method.

A method of channel measurement for intelligent reflecting surface assisted wireless network, adapted to a base station, comprising: transmitting a measurement configuration comprising mode information of an intelligent reflecting surface to a user equipment; receiving a measurement report corresponding to the measurement configuration from the user equipment, wherein the measurement report corresponds to a channel between the user equipment and the intelligent reflecting surface; and outputting a command according to the measurement report.

In one embodiment, the command is transmitted to the intelligent reflecting surface so as to configure the intelligent reflecting surface.

In one embodiment, the command is transmitted to a second base station so as to handover the user equipment to the second base station.

In one embodiment, the mode information comprises at least one of the followings: a current intelligent reflecting surface setting, an index of an intelligent reflecting surface operation mode, or a pattern of a plurality of intelligent reflecting surface operation modes.

In one embodiment, the measurement report is associated with a subset of a plurality of intelligent reflecting surface operation modes supported by the intelligent reflecting surface.

In one embodiment, the subset comprises one of the followings: every operation mode of the plurality of intelligent reflecting surface operation modes; a best operation mode of the plurality of intelligent reflecting surface operation modes; best K operation modes of the of a plurality of intelligent reflecting surface operation modes, wherein K is a positive integer and K is less than a number of the plurality of intelligent reflecting surface operation modes; an operation mode corresponding to an index, wherein the index is indicated by the mode information; an operation mode corresponding to a measurement result, wherein the measurement result is greater than a threshold; and an operation mode corresponding to a first measurement result, wherein a difference between the first measurement result and a second measurement result corresponding to an intelligent reflecting surface disabled mode is greater than an offset.

In one embodiment, the measurement report corresponds to at least one of the followings: a reference symbol received power, a received signal strength indication, a reference signal received quality, or a signal to interference plus noise ratio.

In one embodiment, the measurement report comprises a channel quality.

In one embodiment, the channel quality comprises an average of a plurality of measurement results, wherein the plurality of measurement results correspond to a plurality of intelligent reflecting surface operation modes respectively.

In one embodiment, the channel quality comprises an average of a plurality of measurement results over a measurement period.

In one embodiment, the channel quality is derived from a first measurement result corresponding to a current measurement time and a second measurement result corresponding to a previous measurement time.

In one embodiment, the measurement report comprises a measurement time.

In one embodiment, the measurement configuration is transmitted via a periodic broadcast signaling.

In one embodiment, the periodic broadcast signaling comprises a system information block.

In one embodiment, the measurement configuration is transmitted via a unicast signaling.

In one embodiment, the unicast signaling comprises a radio resource control reconfiguration message.

In one embodiment, the method further comprising: transmitting a measure command to the user equipment to trigger a channel measurement for generating the measurement report.

In one embodiment, the measurement report is generated in response to a measurement result of the channel is greater than a threshold.

In one embodiment, the measurement report is generated in response to a measurement result of the channel is less than or equal to a threshold.

In one embodiment, the method further comprising: allocating an uplink resource for the measurement report.

In one embodiment, the method further comprising: pre-allocating an uplink resource for the measurement report.

In one embodiment, the measurement report is transmitted via a periodic uplink resource.

A base station for intelligent reflecting surface assisted wireless network, comprising: a transceiver; and a processor coupled to the transceiver and configured to: transmit a measurement configuration comprising mode information of an intelligent reflecting surface to a user equipment; receive a measurement report corresponding to the measurement configuration from the user equipment, wherein the measurement report corresponds to a channel between the user equipment and the intelligent reflecting surface; and output a command according to the measurement report.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To further describe the content of the disclosure, embodiments are described below as examples based on which the disclosure may be implemented. In addition, wherever possible, the elements/components/steps with denoted by the same reference numeral in the drawings and embodiments are represent the same or similar parts.

Figure 4:
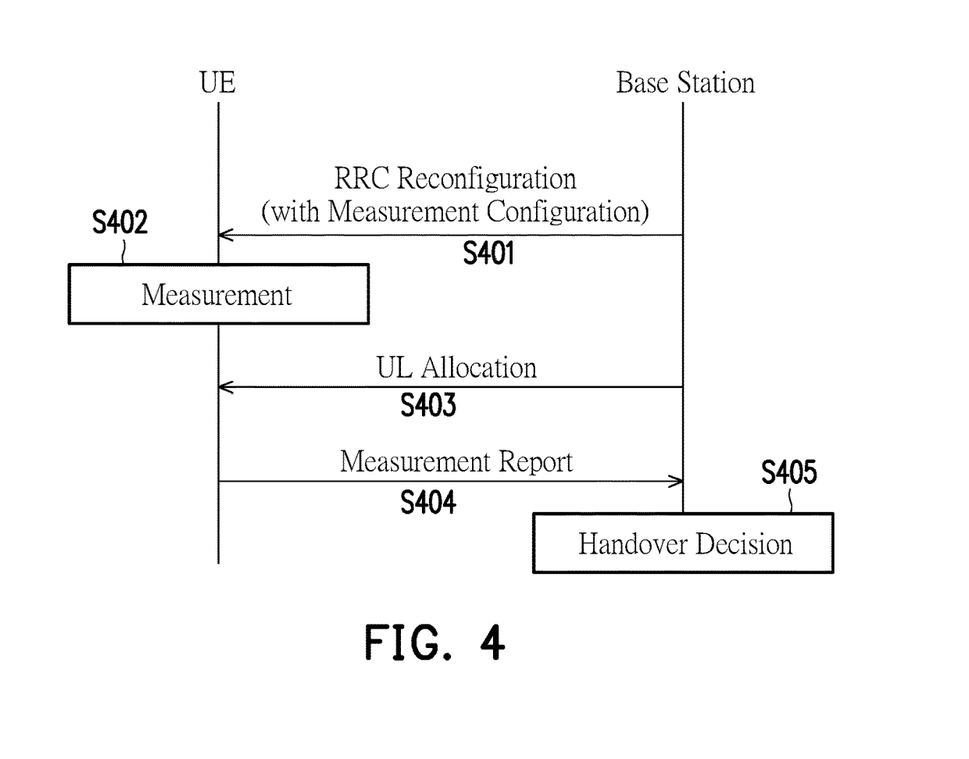
FIG. 4 illustrates a signaling flow of BS-initiated measurement for handover decision according to one exemplary embodiment of the present disclosure.

FIG. 4 illustrates a signaling flow of BS-initiated measurement for handover decision according to one exemplary embodiment of the present disclosure, wherein the base station may include, for example, a gNB, an eNB, a node B, a home eNB, a macro BS, or a pico BS, wherein the UE may include, for example, a wireless device, a master node (MN), an Internet of Things (IoT) device, a mobile station (MS), or a subscriber station (SS).

A base station which operates with one or more IRS(s) may configure a UE for channel measurement. An IRS may include an IRS controller, a meta surface having a plurality of reflecting elements, a control circuit board coupled to the IRS controller, and a copper backplane connecting the control circuit board to the meta surface. The IRS controller may include a wireless transceiver for receiving or transmitting signaling for operation and/or configuration of the IRS. The IRS controller may include a microprocessor, a FPGA, or an ASIC. A reflecting element may include a plurality of meta atoms, wherein each of the reflecting element or the meta atom may be implemented by positive-intrinsic-negative (PIN) nodes, field-effect transistors (FETs), micro-electromechanical system (MEMS) switch, or a tunable chip.

The base station may transmit a measurement configuration to the UE via a signaling message (e.g., a radio resource control (RRC) reconfiguration message) as shown in step S401, wherein the measurement configuration may include mode information of one or more IRS(s). Mode information corresponding to an IRS may include a current IRS setting (e.g., parameters setting for current IRS), an index of an IRS operation mode, or a pattern of a plurality of IRS operation modes. The mode information may indicate multiple operation modes of the IRS respectively corresponding to multiple measurement times to the UE. For example, a pattern included in the mode information may indicate a first operation mode of the IRS corresponding to a first measurement time and a second operation mode of the IRS corresponding to a second measurement time, wherein the second measurement time is different from the first measurement time. The UE may learn from the mode information that the IRS is in the first operation mode at the first measurement time and in the second operation mode at the second measurement time.

After the UE receives the measurement configuration from the base station, the UE may perform measurement for the channel between the UE and the IRS according to the measurement configuration (or mode information), as shown in step S402. In one embodiment, the base station may transmit a measurement command to the UE to trigger the UE to perform channel measurement according to the measurement configuration. The UE may generate a measurement report according to the measurement result of the channel between the UE and the IRS, wherein the measurement report may include the measurement result associated with, for example, a reference symbol received power (RSRP), a received signal strength indication (RSSI), a reference signal received quality (RSRQ), or a signal to interference plus noise ratio (SINR).

Assuming that the IRS has a plurality of IRS operation modes, the measurement configuration may indicate the UE to measure channel condition corresponding to all IRS operation modes or to measure channel condition corresponding to a subset of the plurality of IRS operation modes.

Accordingly, the measurement report generated by the UE may be associated with channel condition corresponding to all of IRS operation modes or channel condition corresponding to the subset of the plurality of IRS operation modes, wherein the subset may include: every operation mode of the plurality of IRS operation modes; a best operation mode of the plurality of IRS operation modes; best K operation modes of the plurality of IRS operation modes (wherein K is a positive integer less than the number of the plurality of IRS operation modes); an operation mode corresponding to an index indicated by the mode information; an operation mode corresponding to a measurement result, wherein the measurement result is greater than a pre-defined threshold; or an operation mode corresponding to a first measurement result, wherein the difference between the first measurement result and a reference measurement result corresponding to an IRS disabled mode is greater than a pre-defined offset.

After the measurement report associated with the IRS is generated, the UE may transmit the measurement report to the base station via an uplink (UL) resource, as shown in step S404. In one embodiment, the base station may allocate the UL resource to the UE for the measurement report in response to transmitting the measurement configuration to the UE, as shown in step S403. In one embodiment, the base station may pre-allocate the UL resource to the UE for the measurement report. The measurement report may include the measurement result, the configuration of the measurements, or the configuration of the IRS operation mode. For example, the measurement report may include an index of IRS operation mode measured by the UE, a selected IRS operation mode corresponding to a measurement result greater than the threshold, or an average of a plurality of measurement results generated by the UE, wherein the plurality of measurement results may respectively correspond to a plurality of IRS operation modes of the IRS.

After the measurement report is received by the base station, the base station may make a handover decision (or an IRS operation mode decision) according to the measurement report, as shown in step S405. The decision in step S405 may be associated with a target cell or an IRS operation mode of an IRS corresponding to the target cell. In one embodiment, the base station may output a handover command to a target base station according to the measurement report so as to inform the target base station that the base station will hand over the UE to the target base station. On the other hand, the base station may send a handover command to a UE according to the measurement report so as to inform the UE to handover to the target base station.

Figure 5:
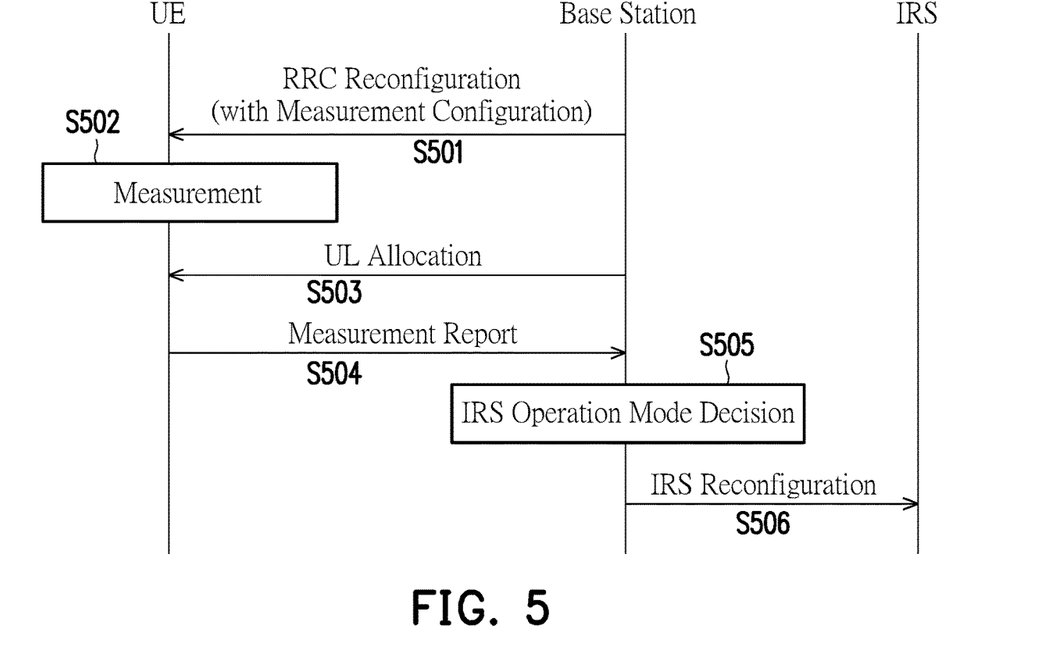
FIG. 5 illustrates a signaling flow of BS-initiated measurement for IRS configuration according to one exemplary embodiment of the present disclosure.

In one embodiment, the base station may output an IRS configuration command to an IRS to configure the IRS. FIG. 5 illustrates a signaling flow of BS-initiated measurement for IRS configuration according to one exemplary embodiment of the present disclosure. In step S501, the base station may transmit a measurement configuration to the UE via a signaling message such as an RRC reconfiguration message. In step S502, the UE may perform measurement for the channel between the UE and the IRS according to the measurement configuration. In step S503, the base station may allocate the UL resource to the UE. In step S504, the UE may transmit the measurement report to the base station via an UL resource. In step S505, the base station may make an IRS operation mode decision (or a handover decision) according to the measurement report. In step S506, the base station may transmit an IRS configuration command to the IRS based on the decision made in step S505 so as to configure the IRS operation mode of the IRS. The configuration for the IRS may improve the channel quality between the UE and the IRS or may reduce the interference to the UE caused by the IRS.

Figure 6:
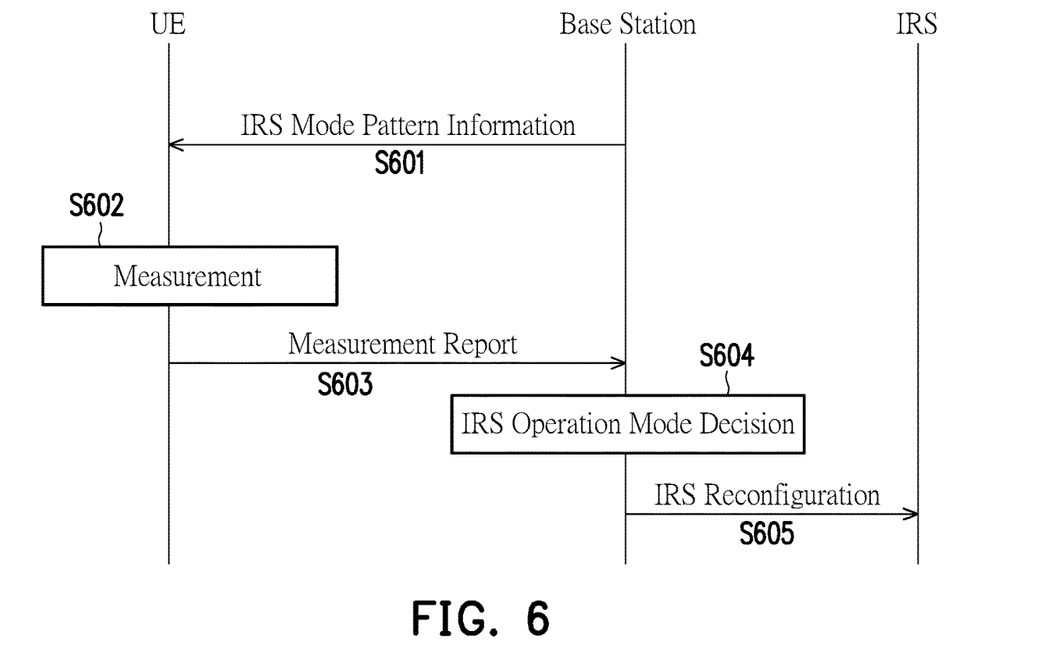
FIG. 6 illustrates a signaling flow of UE-initiated one-time reporting for IRS configuration according to one exemplary embodiment of the present disclosure.

Channel measurement for IRS-assisted wireless network may be initiated by a UE. FIG. 6 illustrates a signaling flow of UE-initiated one-time reporting for IRS configuration according to one exemplary embodiment of the present disclosure. The UE may receive a measurement configuration such as IRS mode pattern information from the base station, as shown in step S601. In one embodiment, the base station may transmit the IRS mode pattern information via a periodic broadcast signaling such as a system information block (SIB). In one embodiment, the base station may transmit the IRS mode pattern information via a unicast signaling such as an RRC reconfiguration message.

The UE may perform channel measurement for the IRS according to the IRS mode pattern information as shown in step S602, wherein the IRS mode pattern information may indicate a plurality of IRS operation modes and a plurality of measurement times corresponding to the plurality of IRS operation modes respectively. The UE may perform channel measurement according to the plurality of IRS operation modes and the plurality of measurement times. For example, the IRS mode pattern may indicate and IRS index corresponding to measurement time t. The UE may measure the channel between the UE and the IRS at measurement time t and may generate a measurement report accordingly, wherein the measurement report may include the measurement result of the channel between the UE and the IRS at measurement time t and the IRS operation mode at measurement time t. In one embodiment, the measurement report may further include a measurement time (e.g., measurement time t) in the form of, for example, frame number or time slot index. The measurement report may be generated or transmitted (e.g., to the base station) by the UE based on criteria of measurement result, as shown in step S603. For example, the UE may generate or transmit the measurement report in response to the measurement result (e.g., RSRP, RSSI, RSRQ, or SINR) of the channel is greater than a threshold. For another example, the UE may generate or transmit the measurement report in response to the measurement result of the channel is less than or equal to a threshold. In step S604, the base station may make an IRS operation mode decision (or a handover decision) according to the measurement report. In step S605, the base station may transmit an IRS configuration command to the IRS based on the decision made in step S604 so as to configure the IRS operation mode of the IRS.

Figure 7:
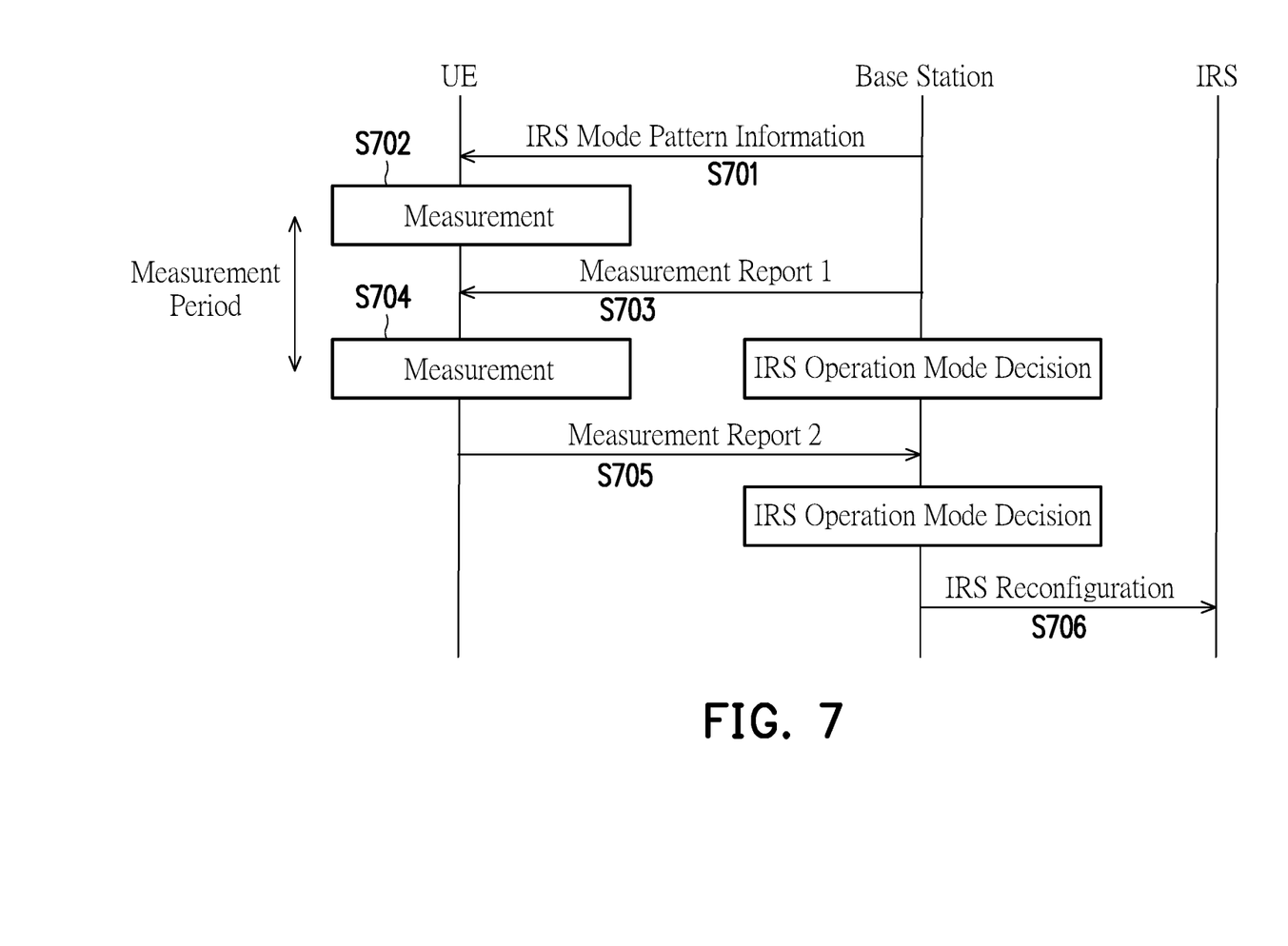
FIG. 7 illustrates a signaling flow of UE-initiated periodic reporting for IRS configuration according to one exemplary embodiment of the present disclosure.

In one embodiment, the UE may transmit the measurement report to the base station periodically. FIG. 7 illustrates a signaling flow of UE-initiated periodic reporting for IRS configuration according to one exemplary embodiment of the present disclosure. In step S701, the base station may transmit a measurement configuration such as IRS mode pattern information to the UE, wherein the IRS mode pattern information may include a measurement period. The UE may perform channel measurements periodically according to the measurement period. As shown in step S702 and step S704, the time difference between the two measurements may equal to the measurement period. The UE may send a measurement report to the base station after each of the channel measurement is completed, as shown in step S703 and step S705. In step S706, the base station may transmit an IRS configuration command to the IRS based on the decision made in step S703 or step S705.

Figure 8:
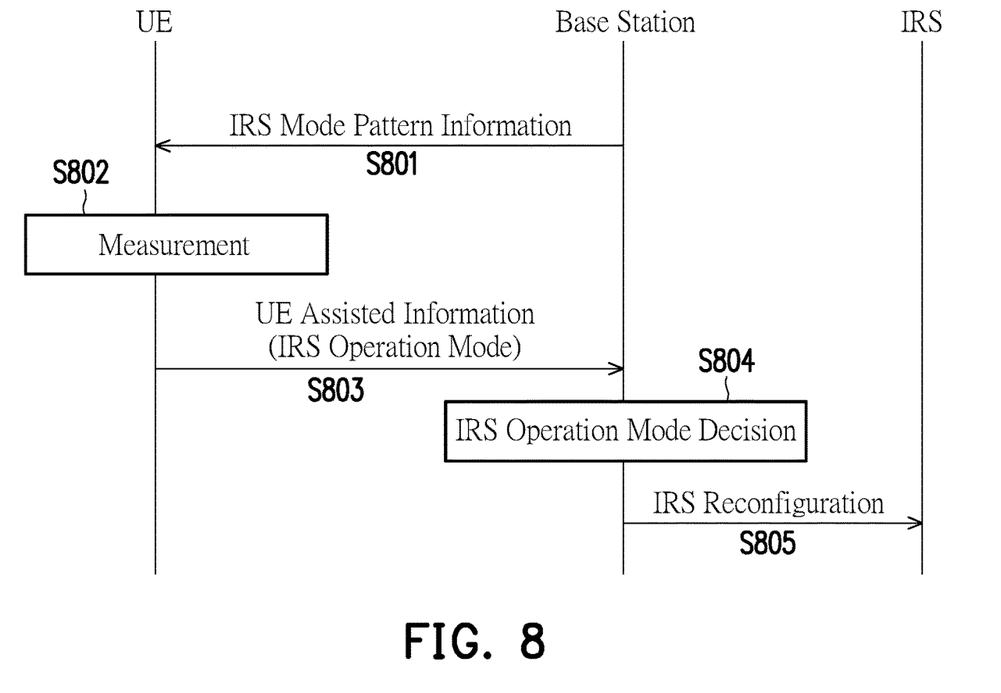
FIG. 8 illustrates a signaling flow of UE assisted information for IRS configuration according to one exemplary embodiment of the present disclosure.

FIG. 8 illustrates a signaling flow of UE assisted information for IRS configuration according to one exemplary embodiment of the present disclosure. In step S801, the base station may transmit a measurement configuration such as IRS mode pattern information to the UE. In step S802, the UE may perform channel measurement according to the measurement configuration. After the channel measurement is completed, the UE assisted information may be generated and transmitted (e.g., to the base station) by the UE according to the measurement result of the channel between the UE and the IRS and the IRS mode pattern information, as shown in step S803. The UE assisted information may include one or more suggested configurations of IRS operation mode. For example, if a measurement result of an IRS operation mode corresponding to index j is better than a threshold, the UE may send UE assisted information message including the index j to the base station. For another example, if a measurement result of an IRS operation mode corresponding to index k fulfills criteria (1), the UE may send UE assisted information message including the index k to the base station, wherein R(k) represents a measurement result corresponding to IRS operation mode k and R(0) represents a measurement result corresponding to IRS disable mode, wherein the measurement result may be associated with RSRP, RSSI, RSRQ, or SINR.

$$R(k)-R(0)>\text{Offset} \qquad (1)$$

After receiving the UE assisted information, the base station may make an IRS operation mode decision according to the UE assisted information, as shown in step S804. In step S805, the base station may transmit an IRS configuration command to the IRS based on the decision made in step S804 so as to configure the IRS operation mode of the IRS.

Figure 9:
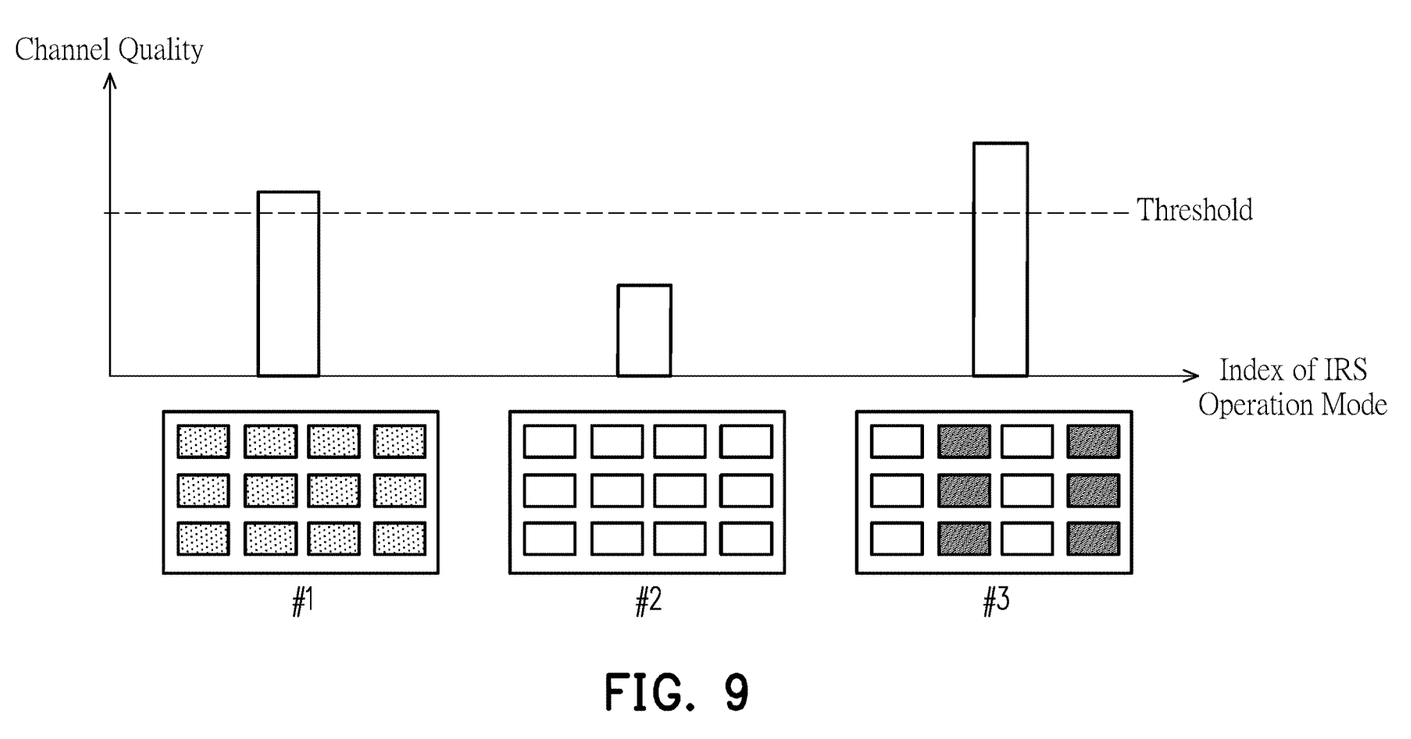
FIG. 9 illustrates a schematic diagram of channel quality measurement of IRS with different IRS operation mode according to one exemplary embodiment of the present disclosure.

The UE may report a set of indices of IRS operation mode, corresponding measurement results, or an average of the corresponding measurement results to the base station via the measurement report, wherein the measurement results respectively corresponding to the indices are greater than a threshold. FIG. 9 illustrates a schematic diagram of channel quality measurement (or measurement result) of IRS with different IRS operation mode according to one exemplary embodiment of the present disclosure. In one embodiment, the UE may not report index #2 but only report index #1 and index #3 to the base station since the channel qualities corresponding to index #1 and index #3 are above the threshold. In one embodiment, the UE may not report the measurement result corresponding to index #2 but only report measurement results respectively corresponding to index #1 and index #3. In one embodiment, the UE may report an average of the measurement results respectively corresponding to index #1 and index #3.

Figure 10:
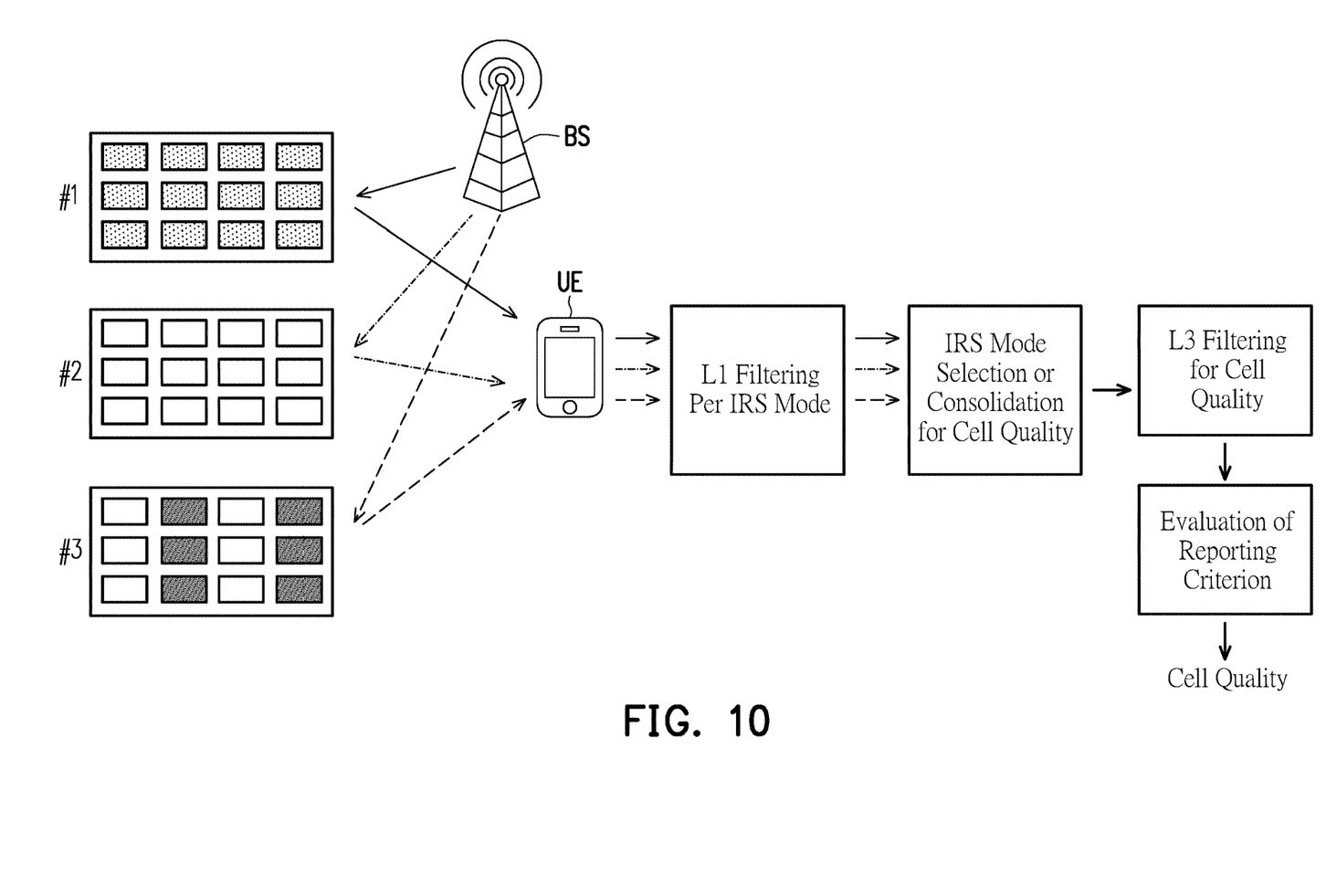
FIG. 10 illustrates a schematic diagram of channel measurement filtering for cell quality report according to one exemplary embodiment of the present disclosure.

FIG. 10 illustrates a schematic diagram of channel measurement filtering for cell quality report according to one exemplary embodiment of the present disclosure. The UE may measure channel quality of the channel between the UE and the IRS with different IRS operation modes. The measurement report (or measurement result) transmitted from the UE to the base station may include the measured channel quality. For example, the UE in FIG. 10 may measure the channel qualities between the UE and the IRS, wherein the channel qualities may include channel quality corresponding to IRS operation mode #1, channel quality corresponding to IRS operation mode #2, and channel quality corresponding to IRS operation mode #3. Specifically, the UE may perform channel measurement for each of the IRS operation modes by applying L1 filtering.

In one embodiment, the UE may estimate an average of the measurement results (or measured quantity) over a measurement period by using, for example, moving average method. The channel quality in the measurement report may include the average of the measurement results.

In one embodiment, a plurality of measurement results (i.e., the plurality of measurement results generated by the UE) respectively corresponding to different IRS operation modes may be individually selected or may be consolidated by the UE or the base station. The channel quality (or cell quality) in the measurement report may include the one or more selected measurement results and/or a weighted average of the one or more selected measurement results. For example, the best measurement result among the plurality of measurement results may be selected. For example, the best K measurement results among the plurality of measurement results may be selected, wherein K is a positive integer less than or equal to the number of the plurality of measurement results. For example, a measurement result may be selected from the plurality of measurement results in response to the selected measurement result is greater than a threshold. The UE may report, to the base station, the measurement results as a cell quality report in response to reporting criteria being met.

In one embodiment, a consolidated measurement corresponding to a plurality of measurement times or a plurality of IRS operation modes may be performed by the UE or the base station. The channel quality (or cell quality) in the measurement report may include the consolidated measurement result. In one embodiment, the UE may perform the consolidated measurement for the channel between the UE and the IRS by applying L3 filtering. The consolidated measurement result may be updated according to formula (2), wherein X(t) represents the consolidated measurement result at measurement time t, X(t-1) represents the consolidated measurement result at measurement time (t-1), M(t) represents a new measurement result of the channel at time t, and w represents a weight (typically, w is between 0 and 1). A UE may report, to the base station, the consolidated measurement result as a cell quality report in response to reporting criteria being met.

$$X(t)=(1-w)*X(t-1)+w*M(t) \qquad (2)$$

Figure 11:
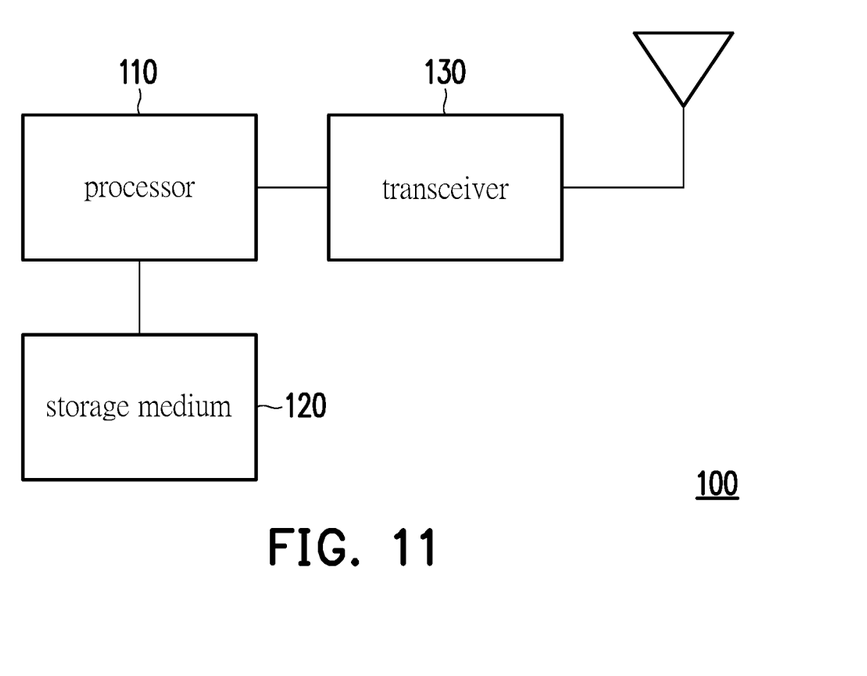
FIG. 11 illustrates a schematic diagram of base station according to one exemplary embodiment of the present disclosure.

FIG. 11 illustrates a schematic diagram of base station according to one exemplary embodiment of the present disclosure. The base station 100 may include a processor 110, a storage medium 120, and a transceiver 130. The processor 110 is coupled to the storage medium 120 and the transceiver 130 and is configured to at least to implement the method as described in FIGS. 1-10 as well as its exemplary embodiment and alternative variations.

The processor 110 could be implemented by using programmable units such as a micro-processor, a micro-controller, a DSP chips, FPGA, etc. The functions of the processor 110 may also be implemented with separate electronic devices or ICs. It should be noted that the functions of processor 110 may be implemented with either hardware or software.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110.

The transceiver 130 may be configured to transmit and receive signals respectively in the radio frequency or in the mmWave frequency. The transceiver 130 may also perform operations such as low noise amplifying, impedance matching, frequency mixing, up or down frequency conversion, filtering, amplifying, and so forth. The transceiver 130 may include one or more digital-to-analog (D/A) converters or analog-to-digital (A/D) converters which are configured to convert from an analog signal format to a digital signal format during uplink signal processing and from a digital signal format to an analog signal format during downlink signal processing. The transceiver 130 may include an antenna array which may include one or multiple antennas to transmit and receive omni-directional antenna beams or directional antenna beams.

Figure 12:
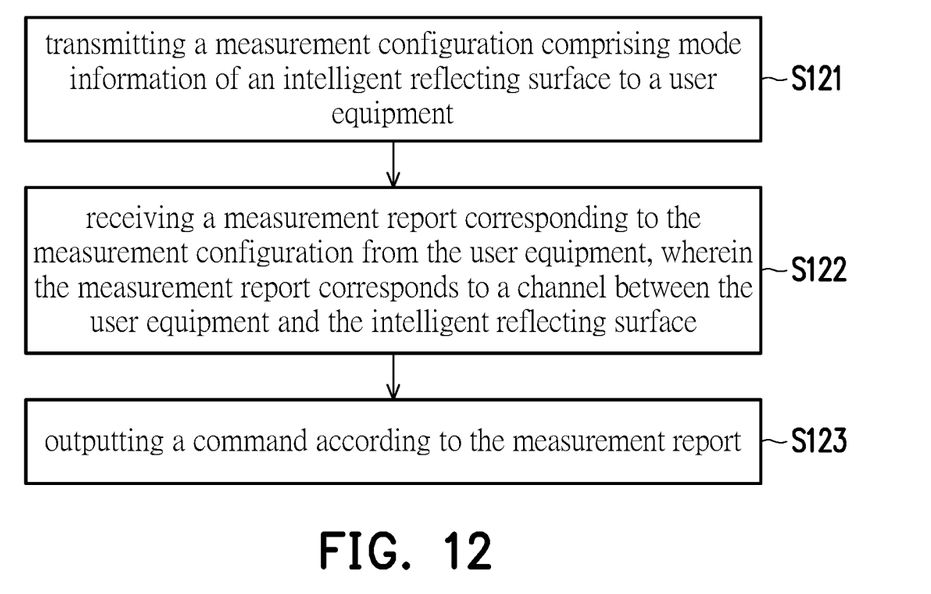
FIG. 12 illustrates a flowchart of a method of channel measurement for IRS-assisted wireless network according to one exemplary embodiment of the present disclosure.

FIG. 12 illustrates a flowchart of a method of channel measurement for IRS-assisted wireless network according to one exemplary embodiment of the present disclosure, wherein the method is adapted to the base station 100 as shown in FIG. 11. In step S121, transmitting a measurement configuration comprising mode information of an intelligent reflecting surface to a user equipment. In step S122, receiving a measurement report corresponding to the measurement configuration from the user equipment, wherein the measurement report corresponds to a channel between the user equipment and the intelligent reflecting surface. In step S123, outputting a command according to the measurement report.

Based on the above, the base station of the present disclosure may trigger the UE to feedback a measurement report associated with the channel between the UE and the IRS. The base station may configure the operation mode for the IRS according to the measurement report so as to improve the channel quality between the UE and the IRS.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of channel measurement for intelligent reflecting surface assisted wireless network, adapted to a base station, comprising:
   transmitting a measurement configuration comprising mode information of an intelligent reflecting surface to a user equipment, wherein the mode information comprises a pattern of a plurality of intelligent reflecting surface operation modes, the plurality of intelligent reflecting surface operation modes comprise a first intelligent reflecting surface operation mode corresponding to a first measurement time and a second intelligent reflecting surface operation mode corresponding to a second measurement time;
   receiving a measurement report corresponding to the measurement configuration from the user equipment, wherein the measurement report corresponds to a channel between the user equipment and the intelligent reflecting surface, the measurement report is associated with a first channel quality of the channel corresponding to the first intelligent reflecting surface operation mode obtained during the first measurement time and a second channel quality of the channel corresponding to the second intelligent reflecting surface operation mode obtained during the second measurement time; and
   outputting a command according to the measurement report, wherein the command indicates to configure one of the first intelligent reflecting surface operation mode and the second intelligent reflecting surface operation mode on the intelligent reflecting surface.

2. The method of claim 1, wherein the command is transmitted to a second base station so as to handover the user equipment to the second base station.

3. The method of claim 1, wherein the mode information further comprises at least one of the followings: a current intelligent reflecting surface setting, or an index of an intelligent reflecting surface operation mode.

4. The method of claim 1, wherein the measurement report is associated with a subset of the plurality of intelligent reflecting surface operation modes supported by the intelligent reflecting surface.

5. The method of claim 4, wherein the subset comprises one of the followings:
   every operation mode of the plurality of intelligent reflecting surface operation modes;
   a best operation mode of the plurality of intelligent reflecting surface operation modes;
   best K operation modes of the of a plurality of intelligent reflecting surface operation modes, wherein K is a positive integer and K is less than a number of the plurality of intelligent reflecting surface operation modes;
   an operation mode corresponding to an index, wherein the index is indicated by the mode information;
   an operation mode corresponding to a third measurement result, wherein the third measurement result is greater than a first threshold; and
   an operation mode corresponding to a fourth measurement result, wherein a difference between the fourth measurement result and a fifth measurement result corresponding to an intelligent reflecting surface disabled mode is greater than an offset.

6. The method of claim 1, wherein the measurement report corresponds to at least one of the followings: a reference symbol received power, a received signal strength indication, a reference signal received quality, or a signal to interference plus noise ratio.

7. The method of claim 1, wherein the first channel quality comprises an average of a plurality of measurement results, wherein the plurality of measurement results correspond to the plurality of intelligent reflecting surface operation modes respectively.

8. The method of claim 1, wherein the first channel quality comprises an average of a plurality of measurement results over a measurement period.

9. The method of claim 1, wherein the measurement report comprises a measurement time.

10. The method of claim 1, wherein the measurement configuration is transmitted via a periodic broadcast signaling.

11. The method of claim 10, wherein the periodic broadcast signaling comprises a system information block.

12. The method of claim 1, wherein the measurement configuration is transmitted via a unicast signaling.

13. The method of claim 12, wherein the unicast signaling comprises a radio resource control reconfiguration message.

14. The method of claim 1, further comprising:
    transmitting a measure command to the user equipment to trigger a channel measurement for generating the measurement report.

15. The method of claim 1, further comprising:
    allocating an uplink resource for the measurement report.

16. The method of claim 1, further comprising:
    pre-allocating an uplink resource for the measurement report.

17. The method of claim 1, wherein the measurement report is transmitted via a periodic uplink resource.

18. The method of claim 1, wherein the measurement report is generated in response to a measurement result of the channel is greater than a threshold.

19. The method of claim 1, wherein the measurement report is generated in response to a measurement result of the channel is less than or equal to a threshold.

20. The method of claim 1, wherein the first channel quality is derived from a first measurement result for the channel corresponding to a current measurement time and a second measurement result for the channel corresponding to a previous measurement time.

21. A base station for intelligent reflecting surface assisted wireless network, comprising:
   a transceiver; and
   a processor coupled to the transceiver and configured to:
   transmit a measurement configuration comprising mode information of an intelligent reflecting surface to a user equipment, wherein the mode information comprises a pattern of a plurality of intelligent reflecting surface operation modes, the plurality of intelligent reflecting surface operation modes comprise a first intelligent reflecting surface operation mode corresponding to a first measurement time and a second intelligent reflecting surface operation mode corresponding to a second measurement time;
   receive a measurement report corresponding to the measurement configuration from the user equipment, wherein the measurement report corresponds to a channel between the user equipment and the intelligent reflecting surface, the measurement report is associated with a first channel quality of the channel corresponding to the first intelligent reflecting surface operation mode obtained during the first measurement time and a second channel quality of the channel corresponding to the second intelligent reflecting surface operation mode obtained during the second measurement time; and
   output a command according to the measurement report, wherein the command indicates to configure one of the first intelligent reflecting surface operation mode and the second intelligent reflecting surface operation mode on the intelligent reflecting surface.

* * * * *